(12) United States Patent
Yasue et al.

(10) Patent No.: US 9,539,789 B2
(45) Date of Patent: Jan. 10, 2017

(54) THREE-DIMENSIONAL FIBER-REINFORCED COMPOSITE AND METHOD FOR PRODUCING THREE-DIMENSIONAL FIBER-REINFORCED COMPOSITE

(71) Applicant: KABUSHIKI KAISHA TOYOTA JIDOSHOKKI, Kariya-shi, Aichi-ken (JP)

(72) Inventors: Masahiko Yasue, Kariya (JP); Ryohei Tsuji, Kariya (JP); Ryuta Kamiya, Kariya (JP); Makoto Tsuzuki, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 42 days.

(21) Appl. No.: 14/422,314

(22) PCT Filed: Aug. 8, 2013

(86) PCT No.: PCT/JP2013/072158
§ 371 (c)(1),
(2) Date: Feb. 18, 2015

(87) PCT Pub. No.: WO2014/030632
PCT Pub. Date: Feb. 27, 2014

(65) Prior Publication Data
US 2015/0246505 A1 Sep. 3, 2015

(30) Foreign Application Priority Data

Aug. 21, 2012 (JP) ................................ 2012-182548

(51) Int. Cl.
*B29B 11/16* (2006.01)
*B32B 7/04* (2006.01)
(Continued)

(52) U.S. Cl.
CPC ............... *B32B 7/04* (2013.01); *B29C 70/025* (2013.01); *B29C 70/081* (2013.01); *B29C 70/24* (2013.01);
(Continued)

(58) Field of Classification Search
CPC Y10T 428/24033; B29B 11/16; D03D 25/005
(Continued)

(56) References Cited

U.S. PATENT DOCUMENTS

2007/0142547 A1*  6/2007  Vaidya ................ E21B 33/1208
                                                    524/847
2007/0232171 A1   10/2007  Maki et al.
2011/0132245 A1*  6/2011  Shah ....................... B64G 1/54
                                                    114/90

FOREIGN PATENT DOCUMENTS

CN       1082125 A      2/1994
GB       1421346 A      1/1976
(Continued)

OTHER PUBLICATIONS

International Preliminary Report on Patentability issued by the International Searching Authority in counterpart International application No. PCT/JP2013/072158, issued on Feb. 24, 2015.
(Continued)

*Primary Examiner* — Alexander Thomas
(74) *Attorney, Agent, or Firm* — Sughrue Mion, PLLC (57) ABSTRACT

A three-dimensional fiber-reinforced composite includes a laminate having a plurality of fiber bundle layers that are layered in a lamination direction and include first and second outermost layers, a matrix resin; and a binding yarn. The binding yarn has first and second traverse yarn sections, and a surface-layer yarn section. The surface layer yarn section has bifurcated sections extending in opposite directions from the first and second traverse yarn sections on the surface of (Continued)

the second outermost layer. An additive and the matrix resin are arranged in a space enclosed by the bifurcated sections and the fiber bundles of the second outermost layer adjacent to the bifurcated sections, and also in a space between each of the first and second traverse yarn sections and fiber bundles adjacent thereto, and in a space between the first and second traverse yarn sections.

6 Claims, 4 Drawing Sheets

(51) Int. Cl.
    *D04H 3/04*     (2012.01)
    *B29C 70/24*     (2006.01)
    *B32B 38/18*     (2006.01)
    *B32B 5/26*     (2006.01)
    *B32B 5/12*     (2006.01)
    *B32B 7/08*     (2006.01)
    *B32B 38/08*     (2006.01)
    *B29C 70/02*     (2006.01)
    *B29C 70/08*     (2006.01)
    *B32B 38/00*     (2006.01)

(52) U.S. Cl.
    CPC . *B32B 5/12* (2013.01); *B32B 5/26* (2013.01); *B32B 7/08* (2013.01); *B32B 38/08* (2013.01); *B32B 38/1816* (2013.01); *D04H 3/04* (2013.01); *B32B 2038/008* (2013.01); *B32B 2260/023* (2013.01); *B32B 2260/046* (2013.01); *B32B 2262/0269* (2013.01); *B32B 2262/101* (2013.01); *B32B 2262/105* (2013.01); *B32B 2305/38* (2013.01); *B32B 2307/54* (2013.01); *D10B 2403/023* (2013.01); *D10B 2505/02* (2013.01); *Y10T 428/24033* (2015.01)

(58) Field of Classification Search
    USPC ........................................................ 428/102
    See application file for complete search history.

(56) References Cited

FOREIGN PATENT DOCUMENTS

| JP | 62-5923 U | 1/1987 |
|---|---|---|
| JP | 08-103960 A | 4/1996 |
| JP | 2005-205815 A | 8/2005 |
| JP | 2007-152672 A | 6/2007 |
| JP | 2007-269034 A | 10/2007 |
| JP | 2007-291582 A | 11/2007 |
| JP | 2009-073918 A | 4/2009 |
| WO | 92/20521 A1 | 11/1992 |
| WO | 03/049928 A1 | 6/2003 |

OTHER PUBLICATIONS

International Search Report for PCT/JP2013/072158 dated Nov. 5, 2013.
Communication dated Mar. 2, 2016 from the European Patent Office in counterpart application No. 13830645.1.

* cited by examiner

THREE-DIMENSIONAL FIBER-REINFORCED COMPOSITE AND METHOD FOR PRODUCING THREE-DIMENSIONAL FIBER-REINFORCED COMPOSITE

CROSS REFERENCE TO RELATED APPLICATIONS

This application is a National Stage of International Application No. PCT/JP2013/072158 filed Aug. 20, 2013, claiming priority based on Japanese Patent Application No. 2012-182548, filed Aug. 21, 2012, the contents of all of which are incorporated herein by reference in their entirety.

TECHNICAL FIELD

The present disclosure relates to a three-dimensional fiber-reinforced composite formed by impregnating matrix resin into a laminate that is formed by binding fiber bundle layers in the lamination direction with a binding yarn, and a method for manufacturing the three-dimensional fiber-reinforced composite.

BACKGROUND ART

Three-dimensional fiber-reinforced composites are used as light, strong materials. A three-dimensional fiber-reinforced composite includes a laminate formed by binding a plurality of fiber bundle layers with binding yarns in matrix resin. Thus, the three-dimensional fiber-reinforced composite has the physical characteristics (mechanical characteristic) superior to materials that only include matrix resin. The three-dimensional fiber-reinforced composite is therefore suitable for a structural component. In addition, the binding yarns allow the three-dimensional fiber-reinforced composite to be stronger in the lamination direction than a two-dimensional fiber-reinforced composite.

Figure 5:
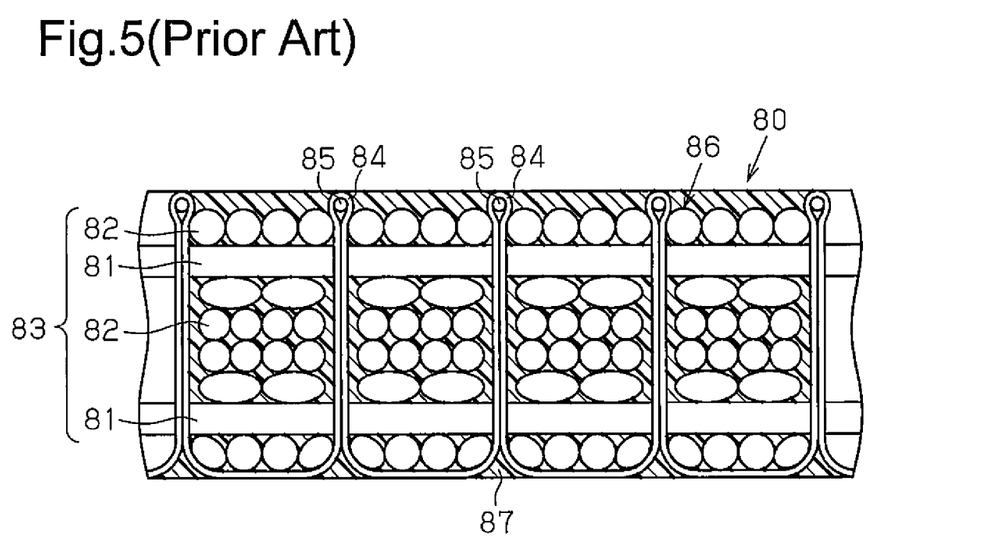
FIG. 5 is a diagram showing a prior art structure.

For example, Patent Document 1 discloses such a three-dimensional fiber-reinforced composite. As shown in FIG. 5, a three-dimensional fiber-reinforced composite 80 of Patent Document 1 includes a flat three-dimensional fabric 86. The three-dimensional fabric 86 includes in-plane direction yarns 83, which include a plurality of warp yarns 81 and a plurality of weft yarns 82, a plurality of out-of-plane direction yarns 84, which are perpendicular to the reference planes of the in-plane direction yarns 83, and a selvage yarn 85, which fixes the out-of-plane direction yarns 84. The three-dimensional fiber-reinforced composite 80 is formed by impregnating the three-dimensional fabric 86 with resin and hardening the resin.

PRIOR ART DOCUMENTS

Patent Documents

Patent Document 1: Japanese Laid-Open Patent Publication No. 2007-152672

SUMMARY OF THE INVENTION

Problems that the Invention is to Solve

In the three-dimensional fiber-reinforced composite 80, when the out-of-plane direction yarns 84 are inserted into the three-dimensional fabric 86 during stitching of the three-dimensional fabric 86, the tension applied to the three-dimensional fabric 86 creates gaps between the out-of-plane direction yarns 84 and the in-plane direction yarns 83 adjacent to the out-of-plane direction yarns 84 and between the sections of the out-of-plane direction yarns 84 that extend in opposite directions. When the three-dimensional fabric 86 is impregnated with resin, the resin remains in the gaps and forms resin pools 87. Hardening and contracting of the resin, for example, create internal stress in the resin pools 87. This may produce cracks around the out-of-plane direction yarns 84 in the three-dimensional fiber-reinforced composite 80.

It is an object of the present disclosure to provide a three-dimensional fiber-reinforced composite capable of reducing cracking of resin pools and a method for manufacturing the three-dimensional fiber-reinforced composite.

Means for Solving the Problems

To achieve the foregoing objective and in accordance with one aspect of the present invention, a three-dimensional fiber-reinforced composite is provided that includes a laminate, a matrix resin, a retention yarn, and a binding yarn. The laminate includes fiber bundle layers that are layered in a lamination direction. The fiber bundle layers include a first outermost layer and a second outermost layer. The laminate is impregnated with the matrix resin. The retention yarn extends along a surface of the first outermost layer. The binding yarn binds the fiber bundle layers in the lamination direction. The binding yarn includes a fold-back section, a primary transverse yarn section and a secondary transverse yarn section, and a surface yarn sections. The fold-back section is folded back on an outer side of the retention yarn in the lamination direction. The primary traverse yarn section and the secondary traverse yarn section are continuous with the fold-back section and extended in a direction perpendicular to planes of the fiber bundle layers. The surface yarn sections extend on a surface of the second outermost layer in directions that are substantially perpendicular to the retention yarn along a plane of the second outermost layer. The surface yarn sections include a bifurcated section that extends in opposite directions from the primary traverse yarn section and the secondary traverse yarn section on the surface of the second outermost layer. An additive and the matrix resin are located in each of a cavity surrounded by the bifurcated section and fiber bundles of the second outermost layer that are adjacent to the bifurcated section, a cavity between each of the primary and secondary traverse yarn sections and fiber bundles that are adjacent to the primary and secondary traverse yarn sections, and a cavity between the primary traverse yarn section and the secondary traverse yarn section.

In this structure, the binding yarn passes through or between the fiber bundles in the fiber bundle layers. This forms gaps around the binding yarn. Gaps are also formed in the bifurcated section and between the primary traverse yarn section and the secondary traverse yarn section. The matrix resin and the additive are located in each gap. The presence of the additive in the gaps, which become resin pools, reduces the proportion of the matrix resin in the resin pools. The additive relieves any internal stress that would be produced in the resin pools by contraction during hardening of the matrix resin or by the difference in linear expansion coefficient between the matrix resin and the fibers. This reduces stress applied to the matrix resin. In the three-dimensional fiber-reinforced composite, cracking around the binding yarn is thus reduced.

The additive may be mixed with a binder and adheres to the laminate, and a total volume of the additive and the binder may constitute 10 to 50% of the cavity surrounded by the bifurcated section and the fiber bundles of the second outermost layer that are adjacent to the bifurcated section.

The setting of the amount of additive to be added prevents the additive from becoming insufficient. This ensures the internal-stress relief effect of the additive. In addition, the setting of the amount of the additive prevents the additive from becoming excessive and lowering the amount of matrix resin. This prevents reduction in the mechanical strength of the three-dimensional fiber-reinforced composite.

The fiber bundle layers, the retention yarn, and the binding yarn may be formed from carbon fibers, and the additive may include carbon black or carbon nanotubes.

In this structure, the fiber bundle layers, the retention yarn, and the binding yarn, which form the three-dimensional fiber-reinforced composite, are formed from carbon fibers. The use of carbon black or carbon nanotubes as the additive allows the sections of the three-dimensional fiber-reinforced composite other than the matrix resin to be formed from carbon materials. This avoids reduction in strength that would otherwise be caused if the base material of the three-dimensional fiber-reinforced composite included non-carbon materials.

To achieve the foregoing objective and in accordance with another aspect of the present invention, a method for manufacturing a three-dimensional fiber-reinforced composite is provided. The method includes: preparing a laminate including fiber bundle layers that are layered in a lamination direction, wherein the fiber bundle layers include first and second outermost layers; preparing a retention yarn extending along a surface of the first outermost layer; and binding the fiber bundle layers in the lamination direction with a binding yarn. The binding yarn includes a fold-back section that is folded back on an outer side of the retention yarn in the lamination direction, a primary traverse yarn section and a secondary traverse yarn section that are continuous with the fold-back section and extended in a direction perpendicular to planes of the fiber bundle layers, surface yarn sections extending on a surface of the second outermost layer in directions perpendicular to the retention yarn along a plane of the second outermost layer, and the surface yarn sections include a bifurcated section that extends in opposite directions from the primary traverse yarn section and the secondary traverse yarn section on the surface of the second outermost layer. The method further includes: supplying an additive to the bifurcated section from outside of the surface of the second outermost layer while drawing the additive from outside of the surface of the first outermost layer, thereby placing the additive in a cavity surrounded by the bifurcated section and fiber bundles of the second outermost layer that are adjacent to the bifurcated section, a cavity between each of the primary traverse yarn section and the secondary traverse yarn section and fiber bundles that are adjacent to the traverse yarn sections, and a cavity between the primary traverse yarn section and the secondary traverse yarn section; and impregnating the laminate that includes the additive with matrix resin.

The drawing of the additive allows the additive that is added to the bifurcated section to be selectively added from the bifurcated section to each gap along the binding yarn.

MODES FOR CARRYING OUT THE INVENTION

Referring to FIGS. 1 to 4C, one embodiment of a three-dimensional fiber-reinforced composite will now be described.

Figure 2:
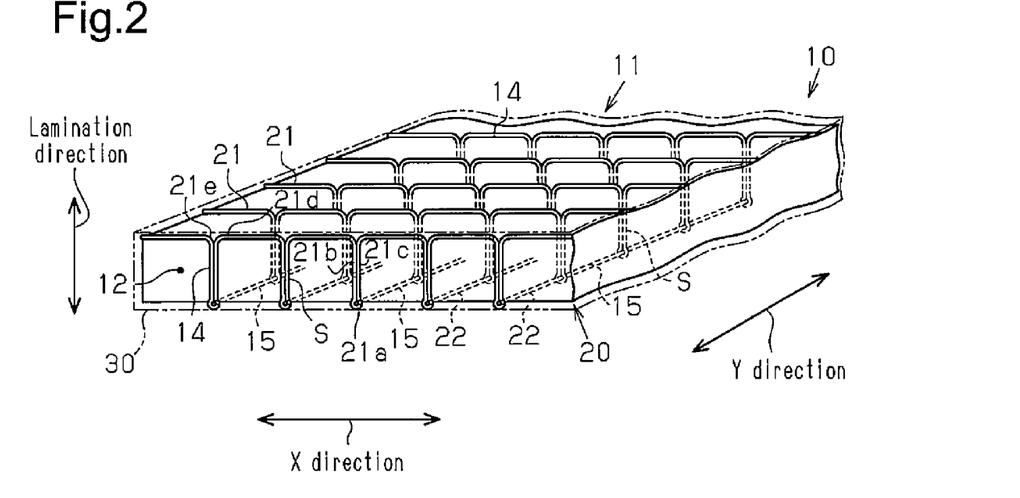
FIG. 2 is a perspective view showing a three-dimensional fiber-reinforced composite of the embodiment.
Figure 3:
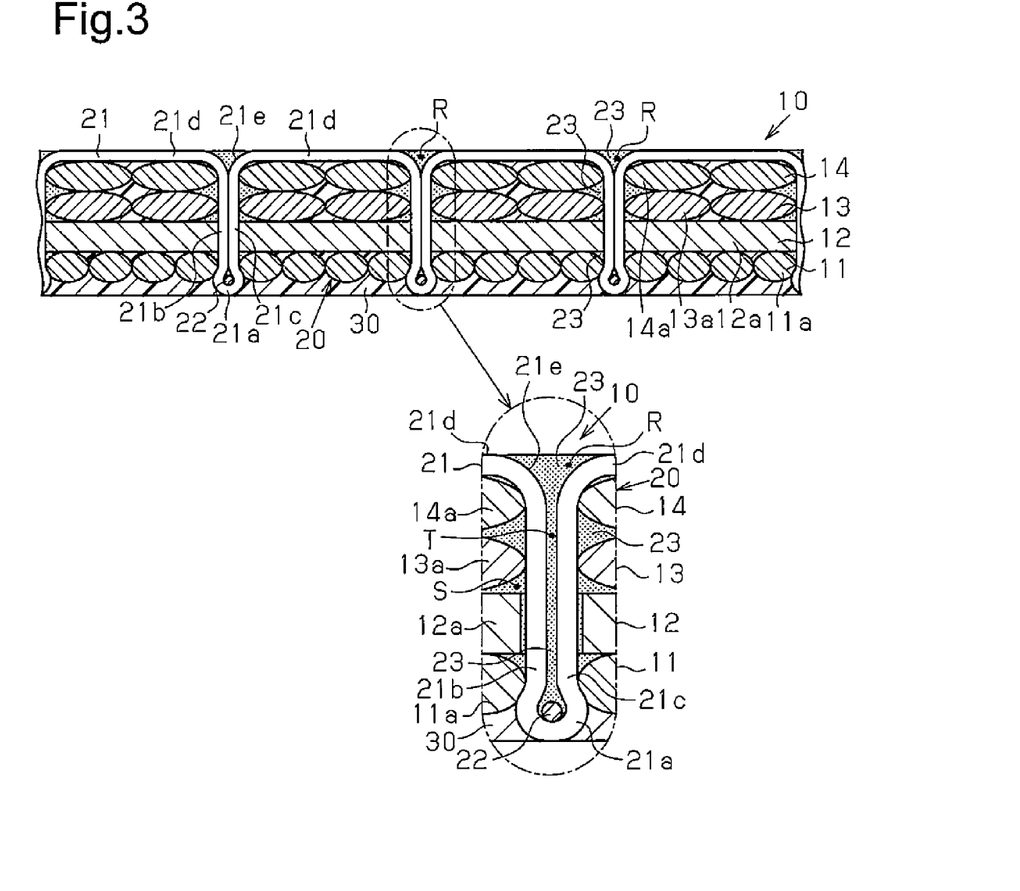
FIG. 3 is a cross-sectional view showing the three-dimensional fiber-reinforced composite of FIG. 2.

As shown in FIGS. 2 and 3, a three-dimensional fiber-reinforced composite 10 includes a laminate 20 and matrix resin 30. The laminate 20 is formed by layering a plurality of sheet-shaped fiber bundle layers, namely, first to fourth reinforcement fiber bundle layers 11 to 14 and by binding the first to fourth reinforcement fiber bundle layers 11 to 14 with binding yarns 21 and retention yarns 22. The matrix resin 30 is formed by impregnating the laminate 20 with resin.

Figure 1:
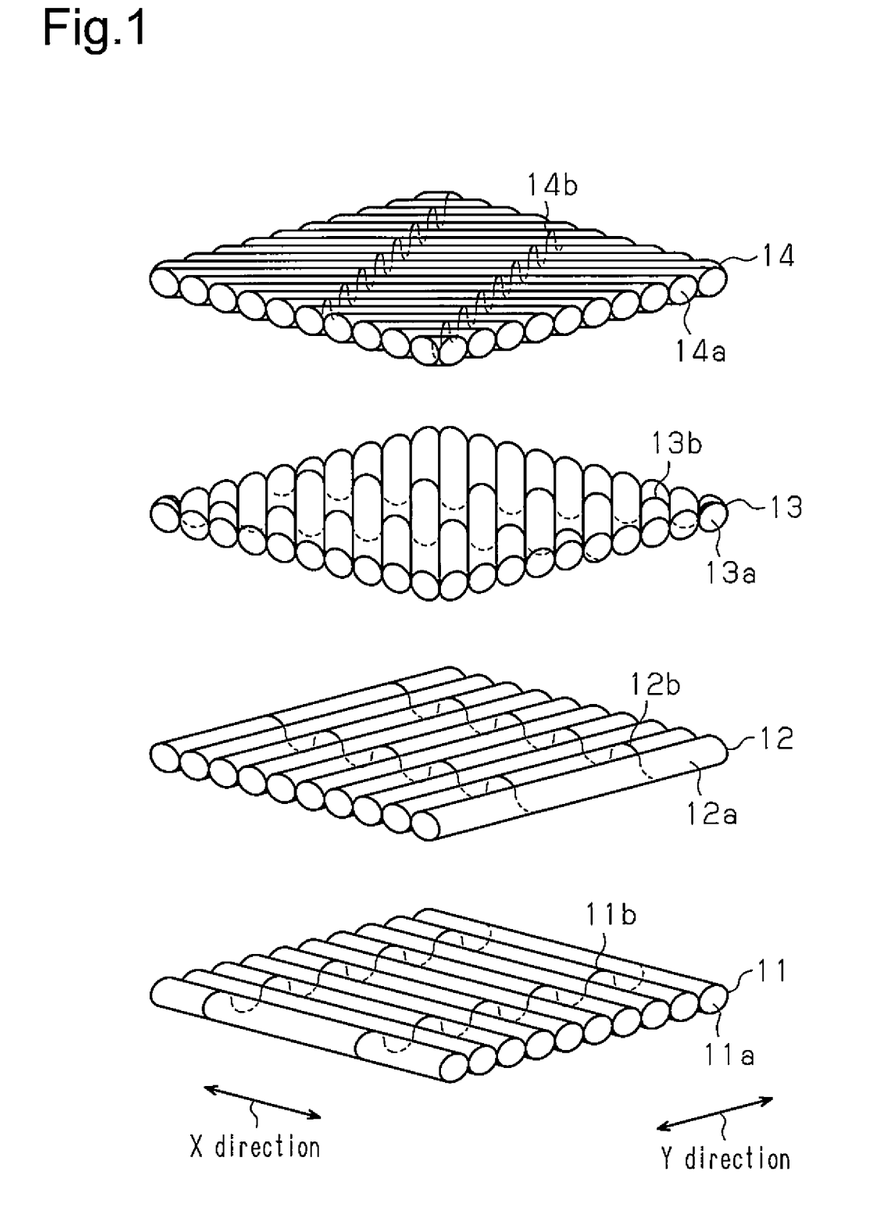
FIG. 1 is an exploded perspective view showing first to fourth reinforcement fiber bundle layers of one embodiment.

As shown in FIG. 1, the first to fourth reinforcement fiber bundle layers 11 to 14 include sets of first to fourth reinforcement fiber bundles 11a to 14a, respectively. The first to fourth reinforcement fiber bundles 11a to 14a are each formed by binding reinforcement fibers. The term "reinforcement fiber bundles" refers to fiber bundles that reinforce the matrix resin 30 of the three-dimensional fiber-reinforced composite 10 when the first to fourth reinforcement fiber bundle layers 11 to 14 are used as the fiber base of the three-dimensional fiber-reinforced composite 10. In the present embodiment, carbon fibers are used as the reinforcement fibers. In the following descriptions, of the directions along the plane of the three-dimensional fiber-reinforced composite 10, the direction along one side of the three-dimensional fiber-reinforced composite 10 is defined as the X direction, and the direction perpendicular to the X direction is defined as the Y direction as shown in FIG. 2. Further, in the three-dimensional fiber-reinforced composite 10, the direction perpendicular to the X direction and the Y direction and in which the first to fourth reinforcement fiber bundle layers 11 to 14 are layered is defined as the lamination direction.

As shown in FIG. 1, the first reinforcement fiber bundle layer 11 is formed by the first reinforcement fiber bundles 11a, which extend linearly in parallel to one another. The first reinforcement fiber bundles 11a have a flattened cross-section. The first reinforcement fiber bundles 11a extend at an angle of 90 degrees to the X direction of the three-dimensional fiber-reinforced composite 10. The first reinforcement fiber bundles 11a are joined together by support yarns 11b extending in the arrangement direction of the first reinforcement fiber bundles 11a.

The second reinforcement fiber bundle layer 12 is formed by the second reinforcement fiber bundles 12a, which extend linearly in parallel to one another. The second reinforcement fiber bundles 12a have a flattened cross-section. The second reinforcement fiber bundles 12a extend in the X direction of the three-dimensional fiber-reinforced composite 10. The second reinforcement fiber bundles 12a are joined together by support yarns 12b extending in the arrangement direction of the second reinforcement fiber bundles 12a.

The third reinforcement fiber bundle layer 13 is formed by the third reinforcement fiber bundles 13a, which extend linearly in parallel to one another. The third reinforcement fiber bundles 13a have a flattened cross-section. The third reinforcement fiber bundles 13a extend at an angle of +45 degrees relative to the X direction of the three-dimensional fiber-reinforced composite 10. The third reinforcement fiber bundles 13a are joined together by support yarns 13b extending in the arrangement direction of the third reinforcement fiber bundles 13a.

The fourth reinforcement fiber bundle layer 14 is formed by the fourth reinforcement fiber bundles 14a, which extend linearly in parallel to one another. The fourth reinforcement fiber bundles 14a have a flattened cross-section. The fourth reinforcement fiber bundles 14a extend at an angle of −45 degrees relative to the X direction of the three-dimensional fiber-reinforced composite 10. The fourth reinforcement fiber bundles 14a are joined together by support yarns 14b extending in the arrangement direction of the fourth reinforcement fiber bundles 14a.

As shown in FIGS. 2 and 3, the laminate 20 is formed by the first to fourth reinforcement fiber bundle layers 11 to 14 that are layered and bound in the lamination direction by a plurality of binding yarns 21. The retention yarns 22 are arranged on the first reinforcement fiber bundle layer 11, which is the first outermost layer of the outermost layers of the laminate 20 in the lamination direction. The retention yarns 22 extend along the surface of the first reinforcement fiber bundle layer 11 and in parallel to one another in the Y direction, and are arranged at intervals in the X direction.

The binding yarns 21 and the retention yarns 22 are formed from carbon fibers. Each binding yarn 21 is inserted into the laminate 20 from the surface of the fourth reinforcement fiber bundle layer 14, which is the second outermost layer of the laminate 20. After extending through the laminate 20 in the lamination direction, the binding yarn 21 is folded back on the outer side of a retention yarn 22 on the surface of the first reinforcement fiber bundle layer 11. The binding yarn 21 is then inserted into the laminate 20 again from the surface of the first reinforcement fiber bundle layer 11 and extends through the laminate 20 in the lamination direction. Then, the binding yarn 21 is pulled out of the surface of the fourth reinforcement fiber bundle layer 14. The section of the binding yarn 21 that is pulled out of the surface of the fourth reinforcement fiber bundle layer 14 extends along the surface of the fourth reinforcement fiber bundle layer 14 in the opposite direction to the section of the binding yarn 21 that is previously pulled out of the fourth reinforcement fiber bundle layer 14. Then, the binding yarn 21 is inserted into the laminate 20 again. Thus, the single binding yarn 21 is repeatedly folded back on the surface of the first reinforcement fiber bundle layer 11 and repeatedly inserted into and pulled out of the surface of the fourth reinforcement fiber bundle layer 14. Accordingly, the single binding yarn 21 binds the laminate 20 at a plurality of positions.

As shown in the enlarged view of FIG. 3, each binding yarn 21 includes fold-back sections 21a, primary traverse yarn sections 21b, and secondary traverse yarn sections 21c. The fold-back sections 21a are arcuate sections that are folded back on the outer sides of the retention yarns 22 in the lamination direction. The primary and secondary traverse yarn sections 21b and 21c are continuous with the fold-back sections 21a and extend in parallel to each other in the laminate 20 from the opposite sides of each retention yarn 22. The binding yarn 21 also includes surface yarn sections 21d that extend along the surface of the fourth reinforcement fiber bundle layer 14 in directions perpendicular to the retention yarns 22. The surface yarn sections 21d include bifurcated sections 21e. Each bifurcated section 21e extends in opposite directions from the associated primary traverse yarn section 21b and secondary traverse yarn section 21c on the surface of the fourth reinforcement fiber bundle layer 14.

When passing through the laminate 20, the binding yarns 21 pass through the first to fourth reinforcement fiber bundles 11a to 14a and between the adjacent ones of the first to fourth reinforcement fiber bundles 11a to 14a. This forms cavities, namely, yarn gaps S, in the laminate 20 between each of the primary and secondary traverse yarn sections 21b and 21c and the first to fourth reinforcement fiber bundles 11a to 14a that are adjacent to the traverse yarn sections. The yarn gaps S are formed in the laminate 20 over the entire dimension in the lamination direction.

In addition, the laminate 20 includes cavities, namely, binding yarn gaps T, between the primary traverse yarn section 21b and the secondary traverse yarn section 21c, which extend from the opposite sides of each retention yarn 22. The binding yarn gaps T are formed in the laminate 20 over the entire dimension in the lamination direction. Further, a cavity, namely, a bifurcated section gap R, is formed in a section surrounded by the portions of the surface yarn sections 21d that form each bifurcated section 21e and the adjacent fourth reinforcement fiber bundles 14a of the fourth reinforcement fiber bundle layer 14.

The yarn gaps S, the binding yarn gaps T, and the bifurcated section gaps R contain (are filled with) matrix resin 30 and an additive 23. Thus, the gaps around the binding yarns 21 contain (are filled with) the matrix resin 30 and the additive 23. The additive 23 is carbon black or carbon nanotubes, which are the same carbon materials as the fiber bundles and have a low linear expansion coefficient. The additive 23 is mixed with a binder (not shown) and adheres to the binding yarns 21 and the reinforcement fiber bundles 11a to 14a. The binder is a material that can be fused by heat to bond the additive 23 to the binding yarns 21 and the reinforcement fiber bundles 11a to 14a. Specifically, the binder can be solid epoxy base resin or thermoplastic resin (such as AP, PP, and PPS).

The total volume of the additive 23 and the binder constitutes 10 to 50% of the volume of the bifurcated section gap R. If the total volume of the additive 23 and the binder is less than 10% of the volume of the bifurcated section gap R, the stress relief effect of the additive 23 decreases. This hinders the reduction of cracking when the bifurcated section gap R, the yarn gaps S, and the binding yarn gaps T become resin pools and is disadvantageous. If the total volume of the additive 23 and the binder is more than 50% of the volume of the bifurcated section gap R, the proportion of the matrix resin 30 in the bifurcated section gaps R, the yarn gaps S, and the binding yarn gaps T decreases. This lowers the mechanical strength of the three-dimensional fiber-reinforced composite 10 and is disadvantageous. The term "the total volume of the additive 23 and the binder" refers to the volume of the additive 23 and the binder that are present in each bifurcated section gap R of the three-dimensional fiber-reinforced composite 10 after manufacture. In addition, the term "the volume of the bifurcated section gap R" refers to the volume of each bifurcated section gap R in the laminate 20.

The bifurcated section gaps R, the yarn gaps S, and the binding yarn gaps T are located in the laminate 20 from one end to the other end in the lamination direction. Thus, the additive 23 is located in the laminate 20 over the entire dimension in the lamination direction.

A method for manufacturing the three-dimensional fiber-reinforced composite 10 will now be described. In the description, the laminate 20 is manufactured in advance by binding the first to fourth reinforcement fiber bundle layers 11 to 14 with the binding yarns 21 and the retention yarns 22.

Figure 4A:
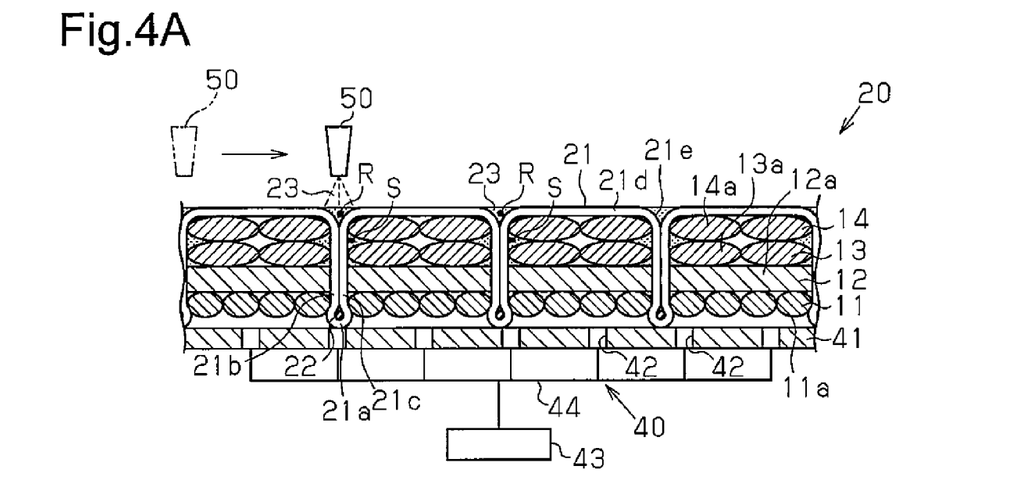
FIG. 4A is a cross-sectional view showing a step of adding and drawing an additive.

As shown in FIG. 4A, the laminate 20 is first placed on a suction device 40. The suction device 40 includes a planar mount portion 41 that has a plurality of suction holes 42 extending through the mount portion 41. In addition, the suction device 40 includes a vacuum pump 43 connected to the suction holes 42 by piping 44. The laminate 20 is placed on the mount portion 41 such that the first reinforcement fiber bundle layer 11 is placed on the mount portion 41 and the bifurcated sections 21e face upward.

Further, an additive dispenser 50 that supplies the additive 23 is located above the suction device 40. The additive dispenser 50 can be moved three-dimensionally over the mount portion 41 by a moving device (not shown). The additive dispenser 50 is filled with the particulate additive 23 that is mixed with the binder.

Then, with the laminate 20 placed on the mount portion 41, the vacuum pump 43 vacuums the laminate 20 through the piping 44 and the suction holes 42. This draws the air in the gaps in the laminate 20 in the lamination direction. When negative pressure is generated in the gaps in the laminate 20, the additive dispenser 50 supplies the additive 23 to the bifurcated sections 21e. The additive 23 supplied to the bifurcated sections 21e is drawn toward the first reinforcement fiber bundle layer 11 from the fourth reinforcement fiber bundle layer 14 in the lamination direction of the laminate 20. That is, the additive 23 is drawn from the bifurcated sections 21e toward the primary and secondary traverse yarn sections 21b and 21c and the fold-back sections 21a. As a result, the additive 23 enters the bifurcated section gaps R, the binding yarn gaps T, and the yarn gaps S and adheres to the binding yarns 21 and the reinforcement fiber bundles 11a to 14a that face the gaps. In other words, the additive 23 is supplied to the laminate 20 over the entire dimension in the lamination direction.

Figure 4B:
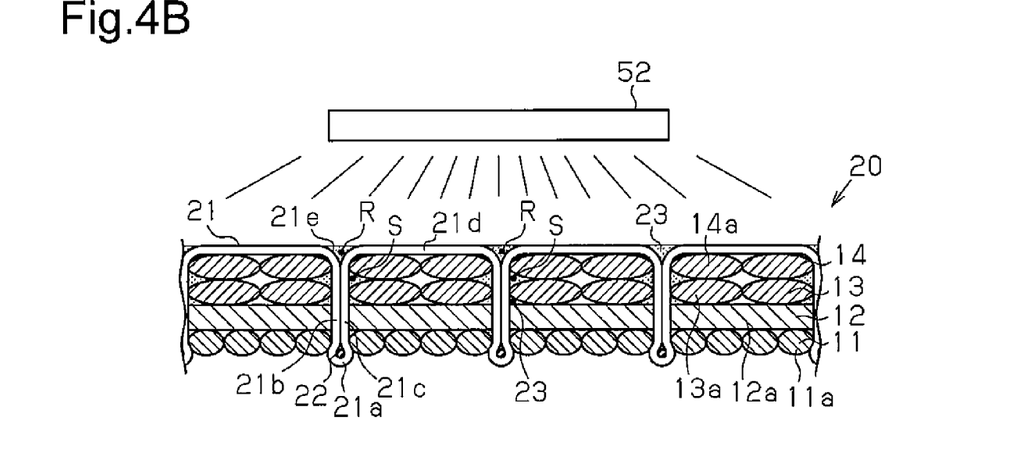
FIG. 4B is a cross-sectional view showing a step of heating the additive.

Then, as shown in FIG. 4B, a heater 52 heats the additive 23. The heater 52 heats the entire laminate 20 from above the laminate 20. The binder melts and bonds the additive 23 to the retention yarns 22 and the reinforcement fiber bundles 11a to 14a that face the gaps R, S and T.

Figure 4C:
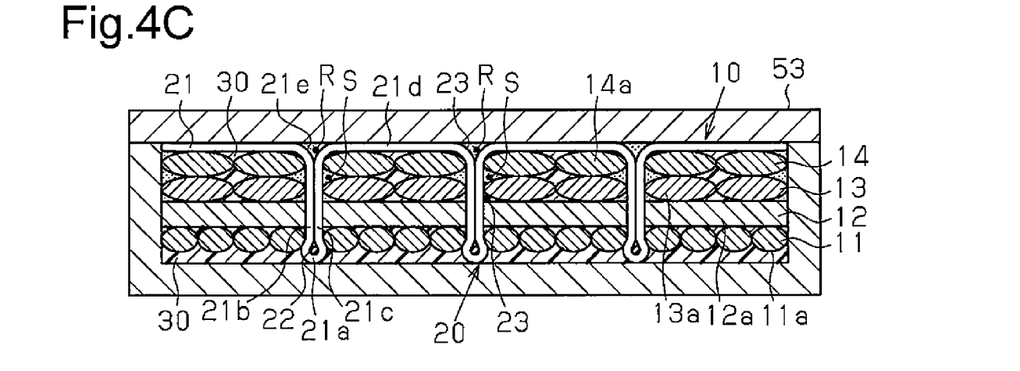
FIG. 4C is a cross-sectional view showing a step of impregnating and hardening matrix resin.

As shown in FIG. 4C, the laminate 20, to which the additive 23 adheres, is then placed in a mold 53 that is used in the resin transfer molding (RTM) method. Thermosetting resin is introduced into the mold 53 and impregnated into the reinforcement fiber bundle layers 11 to 14, the binding yarns 21, and the retention yarns 22 of the laminate 20, and the bifurcated section gaps R, the yarn gaps S, and the binding yarn gaps T are filled with the thermosetting resin. The thermosetting resin is then heated and hardened to form the matrix resin 30. The matrix resin 30 is hardened around the reinforcement fiber bundle layers 11 to 14, the binding yarns 21, and the retention yarns 22 and forms the three-dimensional fiber-reinforced composite 10.

Operation of the three-dimensional fiber-reinforced composite 10 will now be described.

In manufacturing the laminate 20, insertion of each binding yarn 21 in the lamination direction of the laminate 20 forms the yarn gaps S, the bifurcated section gaps R, and the binding yarn gaps T. When the matrix resin 30 is impregnated in the laminate 20 and hardened after the laminate 20 is manufactured, the additive 23 is located in the gaps R, S and T, which become resin pools. This reduces the proportion of the matrix resin 30 in the gaps R, S and T. The additive 23 relieves any internal stress that would be produced in the resin pools due to hardening and contracting of the thermosetting resin, for example.

The above described embodiment achieves the following advantages.

(1) In the laminate 20, which is bound together in the lamination direction by the binding yarns 21, the bifurcated section gaps R, the yarn gaps S, and the binding yarn gaps T, which are formed around the binding yarns 21, contain both the matrix resin 30 and the additive 23. Thus, the additive 23 relieves any internal stress that would be produced in the resin pools formed by the gaps R, S and T when forming the matrix resin 30. This reduces cracking in the bifurcated section gaps R, the yarn gaps S, and the binding yarn gaps T, which are located around the binding yarns 21 in the three-dimensional fiber-reinforced composite 10.

(2) The additive 23 adheres to the laminate 20 such that the total volume of the additive 23 and the binder constitutes 10 to 50% of the volume of the bifurcated section gap R. Setting the lower limit of the amount of the additive 23 that is added (adheres) prevents reduction in the stress relief effect of the additive 23. This reduces cracking in the bifurcated section gaps R, the yarn gaps S, and the binding yarn gaps T. In addition, setting the upper limit of the amount of the additive 23 that is added (adheres) prevents reduction in the amount of the matrix resin 30 in the gaps R, S and T. This limits reduction in the mechanical strength of the three-dimensional fiber-reinforced composite 10.

(3) The additive 23 is carbon black or carbon nanotubes. In addition, the first to fourth reinforcement fiber bundle layers 11 to 14, the binding yarns 21, and the retention yarns 22 are formed from carbon fibers. Thus, the laminate 20 is made only of carbon materials. This prevents reduction of the strength of the three-dimensional fiber-reinforced composite 10, which would otherwise be caused by a presence of materials other than carbon fibers.

(4) When the laminate 20 is bound together by the binding yarn 21, the bifurcated section gaps R, the binding yarn gaps T, and the yarn gaps S are formed in the lamination direction in the laminate 20. However, the presence of the additive 23 in the laminate 20 over the entire dimension in the lamination direction along the binding yarns 21 reduces cracking of the laminate 20. The addition of the additive 23 to the three-dimensional fiber-reinforced composite 10, the strength of which in the lamination direction is increased by the binding yarns 21, further increases the strength of the three-dimensional fiber-reinforced composite 10 in the lamination direction.

(5) The additive 23 is mixed with the binder and adheres to the binding yarns 21 and the reinforcement fiber bundles 11a to 14a. Thus, the additive 23 is not removed from the binding yarns 21 or the reinforcement fiber bundles 11a to 14a when the thermosetting resin in introduced. This ensures that internal stress in the gaps R, S and T is reduced during formation of the matrix resin 30.

(6) In manufacturing the three-dimensional fiber-reinforced composite 10, the additive 23 is supplied to the bifurcated section gaps R of the laminate 20 while the air in the laminate 20 is drawn from the surface opposite to the surface that includes the bifurcated section gaps R. Accordingly, the additive 23 is drawn toward the surface opposite to the surface that includes the bifurcated section gaps R. This disperses the additive 23 from the bifurcated section gaps R along the binding yarns 21 in the laminate 20 over the entire dimension in the lamination direction, enabling the additive 23 to adhere to the binding yarns 21, which form the gaps R, S and T.

(7) Even though resin pools are formed in the bifurcated section gaps R, the yarn gaps S, and the binding yarn gaps T, the additive 23 relieves internal stress of the resin pools and reduces cracking in the gaps R, S and T. This eliminates the need to use fine yarns (e.g., yarn of 100-denier or less) as the binding yarns 21 in order to minimize the gaps R, S and T, and the strength in the lamination direction is maintained while reducing cracking.

(8) Even though resin pools are formed in the bifurcated section gaps R, the yarn gaps S, and the binding yarn gaps T, the additive 23 relieves internal stress of the resin pools and reduces cracking in the gaps R, S and T. This eliminates the need to form the first to fourth reinforcement fiber bundles 11a to 14a and the binding yarns 21 from organic fibers that have similar thermal characteristics as the matrix resin 30. Thus, the first to fourth reinforcement fiber bundles 11a to 14a and the binding yarns 21 can be formed from carbon fibers. This maintains the mechanical strength of the three-dimensional fiber-reinforced composite 10 while reducing cracking.

The above described embodiment may be modified as follows.

The binder may be omitted.

In the illustrated embodiment, thermosetting resin is used as the matrix resin 30. However, other types of resin may be used.

The binder and the additive 23 are supplied such that their total volume constitutes 10 to 50% of the volume of each bifurcated section gap R. The remaining 50 to 90% of the volume may be occupied by matrix resin, or may be empty.

Each of the numbers of the binding yarns 21 and the retention yarns 22 may be one.

Instead of supplying the additive 23 to the bifurcated section gaps R of the binding yarns 21, the additive 23 may be applied to the entire surface of the fourth reinforcement fiber bundle layer 14 of the laminate 20.

As long as the laminate 20 includes a plurality of layers, the laminate 20 may include two or three layers, or may include five or more layers.

In the illustrated embodiment, the first to fourth reinforcement fiber bundle layers 11 to 14 are joined by the support yarns 11b to 14b, respectively. However, the present invention is not limited to such a structure. For example, fusible yarns may be arranged on one side of each of the first to fourth reinforcement fiber bundle layers 11 to 14 to join together each set of the reinforcement fiber bundles 11a to 14a. Alternatively, in the first to fourth reinforced fiber bundle layers 11 to 14, pins may be arranged at the opposite axial ends of each of the reinforcement fiber bundles 11a to 14a, and a joining yarn may engage the pins to join together each set of the reinforcement fiber bundles 11a to 14a.

The fibers that form the first to fourth reinforcement fiber bundles 11a to 14a are not limited to carbon fibers. Depending on the required physical properties of the three-dimensional fiber-reinforced composite 10, high-strength organic fibers such as aramid fibers, poly-p-phenylenebenzobisoxazole fibers, and ultrahigh molecular weight polyethylene fibers, or inorganic fibers such as glass fibers and ceramic fibers may be used.

Instead of carbon fibers, fibers such as glass fibers, aramid fibers, or ceramic fibers may be bound or twisted to form the retention yarns 22 and the binding yarns 21.

The three-dimensional fiber-reinforced composite 10, which includes the laminate 20 and the matrix resin 30 may be made by a method other than the RTM method.

The invention claimed is:

1. A three-dimensional fiber-reinforced composite comprising:
    a laminate including fiber bundle layers that are layered in a lamination direction, wherein the fiber bundle layers include a first outermost layer and a second outermost layer;
    a matrix resin with which the laminate is impregnated;
    a retention yarn extending along a surface of the first outermost layer; and
    a binding yarn that binds the fiber bundle layers in the lamination direction, wherein
    the binding yarn includes:
        a fold-back section that is folded back on an outer side of the retention yarn in the lamination direction;
        a primary traverse yarn section and a secondary traverse yarn section that are continuous with the fold-back section and extended in a direction perpendicular to planes of the fiber bundle layers; and
        surface yarn sections extending on a surface of the second outermost layer in directions that are substantially perpendicular to the retention yarn along a plane of the second outermost layer,
    the surface yarn sections include a bifurcated section that extends in opposite directions from the primary traverse yarn section and the secondary traverse yarn section on the surface of the second outermost layer, and
    the matrix resin is located in each of a first cavity surrounded by the bifurcated section and fiber bundles of the second outermost layer that are adjacent to the bifurcated section, a second cavity between each of the primary and secondary traverse yarn sections and fiber bundles that are adjacent to the primary and secondary traverse yarn sections, and a third cavity between the primary traverse yarn section and the secondary traverse yarn section, and
    an additive is located only in the first, second and third cavities.

2. The three-dimensional fiber-reinforced composite according to claim 1, wherein
    the additive is mixed with a binder and adheres to the laminate, and
    a total volume of the additive and the binder constitutes 10 to 50% of the first cavity.

3. The three-dimensional fiber-reinforced composite according to claim 2, wherein the binder is thermosetting resin.

4. The three-dimensional fiber-reinforced composite according to claim 1, wherein the fiber bundle layers, the retention yarn, and the binding yarn are formed from carbon fibers, and
    the additive includes carbon black or carbon nanotubes.

5. A method for manufacturing a three-dimensional fiber-reinforced composite, the method comprising:
    preparing a laminate including fiber bundle layers that are layered in a lamination direction, wherein the fiber bundle layers include first and second outermost layers;
    preparing a retention yarn extending along a surface of the first outermost layer;
    binding the fiber bundle layers in the lamination direction with a binding yarn, wherein
    the binding yarn includes a fold-back section that is folded back on an outer side of the retention yarn in the lamination direction, a primary traverse yarn section and a secondary traverse yarn section that are continuous with the fold-back section and extended in a direction perpendicular to planes of the fiber bundle layers, surface yarn sections extending on a surface of the second outermost layer in directions perpendicular to the retention yarn along a plane of the second outermost layer, and the surface yarn sections include a bifurcated section that extends in opposite directions from the primary traverse yarn section and the secondary traverse yarn section on the surface of the second outermost layer;

supplying an additive only to the bifurcated section from outside of the surface of the second outermost layer while drawing the additive from outside of the surface of the first outermost layer, thereby placing the additive only in a first cavity surrounded by the bifurcated section and fiber bundles of the second outermost layer that are adjacent to the bifurcated section, a second cavity between each of the primary traverse yarn section and the secondary traverse yarn section and fiber bundles that are adjacent to the traverse yarn sections, and a third cavity between the primary traverse yarn section and the secondary traverse yarn section; and impregnating the laminate that includes the additive with matrix resin.

6. The method for manufacturing a three-dimensional fiber-reinforced composite according to claim 5, wherein the additive is mixed with a binder and supplied to the laminate, and a total volume of the additive and the binder constitutes 10 to 50% of the first cavity.

* * * * *

UNITED STATES PATENT AND TRADEMARK OFFICE
CERTIFICATE OF CORRECTION

| | |
|---|---|
| PATENT NO. | : 9,539,789 B2 |
| APPLICATION NO. | : 14/422314 |
| DATED | : January 10, 2017 |
| INVENTOR(S) | : Yasue et al. |

Page 1 of 1

It is certified that error appears in the above-identified patent and that said Letters Patent is hereby corrected as shown below:

On the Title Page

Column 1, item (22), correct the PCT filing date as follows:
Delete "Aug. 8, 2013" and add --Aug. 20, 2013--

Signed and Sealed this
Eleventh Day of April, 2017

Michelle K. Lee
*Director of the United States Patent and Trademark Office*